UNITED STATES PATENT OFFICE.

GASTON PHILIPPE GUIGNARD, OF MELUN, FRANCE.

PROCESS FOR THE PREPARATION OF MANNITE FROM NATURAL MUSTS.

1,175,747.　　　　　　　Specification of Letters Patent.　　Patented Mar. 14, 1916.

No Drawing.　　　　Application filed March 5, 1913.　Serial No. 752,217.

*To all whom it may concern:*

Be it known that I, GASTON PHILIPPE GUIGNARD, a citizen of the Republic of France, and a resident of Avenue des Marronniers, Melun, in the Department of Seine-et-Marne, France, chemical engineer, have invented a new and useful Process for the Preparation of Mannite from Natural Musts, of which the following is a specification.

This invention relates to the preparation of mannite from natural musts.

It is known that mannite is produced by the fermentation of levulose, either under the influence of the bacteria of viscous fermentations, or under the influence of the mannitic ferment investigated by Gayon and found in the wines of Algeria. It is also known to prepare mannite by fermentation from artificial musts, but the net cost of this mannite is extremely high.

The present invention consists of a process for the preparation of mannite from natural musts containing polyglucosides adapted to yield levulose by hydrolysis.

The process of the present invention comprises two principal parts: I. The process of effecting the fermentation of the natural musts in conditions such that they afford the maximum yield; II. The process of separating the mannite so produced from the many products contained with it in the natural musts.

The natural musts to which the process of the present invention may be applied are in general all those derived from saccharine juices containing levulose, either naturally or by the inversion of a polyglucoside.

The following description relates to the application of the process of the present invention to the most difficult case, that is to say the preparation of mannite from beetroot musts:

*I. Fermentation of the natural must.*

In order to obtain mannite economically, it is necessary to start from beetroots as rich in sugar as possible. On the other hand in order that the mannitic fermentation may give the maximum yield of mannite, it is necessary for the must to contain at least 150 grams of levulose per liter. The beet must is first of all prepared by any of the usual known methods; mineral acid, preferably sulfuric, is then added, and the whole is brought to boiling in such a way as to invert the sugar. The total inversion once produced, an excess of carbonate preferably carbonate of lime is added in order to neutralize the liquid. There is then added a certain quantity of brewers' yeast, about 7 kilograms per hectoliter of must. This yeast has preferably been first suspended in a small quantity of boiling water and maintained at boiling for half an hour so as to be completely killed. After the addition of the yeast, the must is concentrated so as to obtain the desired richness in levulose. This concentration takes place *in vacuo*, and almost half of the water contained in the must is removed. The concentrated must is then sterilized at 120 degrees C. and fertilized by means of a pure mannitic leaven specially prepared, as follows.

*Preparation of the mannitic leaven.*—It is known that the mannitic ferment flourishes in artificial musts which contain foods of all the necessary kinds (carbohydrates, nitrogenous and saline) in proportionate quantities. As regards natural musts, the concentration to which it is necessary to subject them with a view to obtaining the desired richness in levulose produces at the same time an increase in the content of other substances, in particular of alkaline salts of mineral or organic nature, the presence of which affects the life of the ordinary mannitic ferment. It is, therefore, necessary to accustom or acclimatize the ferment to the must in which it is to live. To obtain the best results, it is advisable to fertilize the natural must only with a ferment accustomed to live in a more concentrated must. The accustoming or "acclimatizing" of the ferments is effected in the following manner:—The mannitic ferment derived from cultures upon concentrated artificial musts serves for the fertilization of a beetroot must prepared as stated above but of very low concentration. This ferment serves for the fertilization of a second beetroot must more concentrated than the first and so until the ferment has served for the fertilization of a must of higher concentration than the principal must to be treated. The ferment accustomed in this way can be utilized with certainty of success for the fertilization of the principal must.

*Fermentation of the principal must.*—Invert sugar consists, as is known, of glucose and levulose. The mannitic ferment yields with these two substances the following series of compounds:—(a) With levulose: mannite, acetic acid, lactic acid, glycerin, succinic acid, carbonic aid. (b) With glucose: ordinary alcohol, lactic acid, acetic acid, glycerin, carbonic acid. Fermentation takes place in sterilized vats, closed and protected from entrance of air. All possible precautions in construction must be taken in order to avoid contamination. The carbonic acid is removed from the fermentation vats by mechanical aspiration and conducted to washers with a view to the recovery of the alcoholic vapors which it contains. When the fermentation is completed, the mannite is next separated.

II. Separation of the mannite.

The must is first of all distilled in order to recover the alcohol produced by the fermentation. There remains a vinasse which is evaporated to dryness, affording a mass containing: mannite, carbonate of lime, sulfate of lime, alkaline malates, lactate of lime, acetate of lime, glycerin, nitrogenous substances soluble in alcohol, various saline substances derived from the musts.

Mannite is hardly at all soluble in cold alcohol; advantage is taken of this property to operate in the following manner:—Alcohol is saturated while cold with mannite and the dried vinasse is washed with this alcohol, which dissolves the glycerin, the nitrogenous substances soluble in alcohol and the alkaline malates. The residue of the washing, freed from alcohol by heat, is taken up in water and ferrous sulfate is then added. The lactate and acetate of lime are transformed into ferrous lactate and acetate insoluble in hot alcohol. The lime passes into the state of sulfate. The mass is evaporated afresh to dryness, then washed with hot alcohol which dissolves the mannite alone; the latter is precipitated by cooling.

The process of the present invention is suitable for the treatment of all natural musts containing levulose, with if necessary certain modifications of detail which vary with the nature of the musts and are evident to one skilled in the art.

Having now particularly described and ascertained the nature of my said invention and in what manner the same is to be performed, I declare that what I claim is:—

1. In the process of obtaining mannite from natural musts, the steps of fertilizing inverted, neutralized, concentrated and sterilized natural musts having at least 150 grams of levulose per liter by means of mannite ferments previously accustomed to live in natural musts of higher concentration than the must under treatment, fermenting the thus fertilized must, and separating the mannite produced by this fermentation of the mass.

2. In the process of obtaining mannite from natural musts, the steps of fertilizing inverted, neutralized, concentrated and sterilized natural musts having at least 150 grams of levulose per liter by means of mannite ferments previously gradually accustomed step by step to live in natural musts of higher concentration than the must under treatment, fermenting the thus fertilized must, and separating the mannite produced by this fermentation of the mass.

3. In the process of obtaining mannite from natural musts, the steps of fertilizing inverted, neutralized, concentrated and sterilized natural musts by means of mannite ferments previously accustomed to live in natural musts of higher concentration than the must under treatment, fermenting the thus fertilized must, distilling off the alcohol produced by this fermentation, desiccating the remaining vinasse, washing the latter with cold alcohol saturated with mannite, evaporating the alcohol from the residue, dissolving the residue in water, adding ferrous sulfate, evaporating to dryness, washing with hot alcohol to dissolve mannite alone and precipitating the mannite therefrom by cooling.

4. In the process of obtaining mannite from natural musts, the steps of fertilizing inverted, neutralized, concentrated and sterilized natural musts having at least 150 grams of levulose per liter by means of a mannite ferment previously accustomed to live in natural musts of higher concentration than the must under treatment, for the purpose described.

5. In the process of obtaining mannite from natural musts, the step of fertilizing natural musts by means of a mannite ferment previously acclimatized to a must having more than 150 grams of levulose per liter.

6. In the process of obtaining mannite from natural musts, the step of fertilizing natural musts, having at least 150 grams of levulose per liter, by means of a mannite ferment acclimatized to a must having a higher concentration than the must under treatment.

In testimony whereof I have signed my name to this specification, in the presence of two subscribing witnesses.

GASTON PHILIPPE GUIGNARD.

Witnesses:
JAQUES LEJEUNE,
FERNAND GRIVAULT.